United States Patent
Waltho et al.

(10) Patent No.: US 8,032,086 B2
(45) Date of Patent: Oct. 4, 2011

(54) METHOD AND APPARATUS FOR MANAGING COMMUNICATIONS

(75) Inventors: Alan E. Waltho, San Jose, CA (US); Jeffrey Schiffer, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 1478 days.

(21) Appl. No.: 10/953,142

(22) Filed: Sep. 28, 2004

(65) Prior Publication Data
US 2006/0067354 A1 Mar. 30, 2006

(51) Int. Cl.
*H04B 1/00* (2006.01)
*H04B 15/00* (2006.01)
*H04B 17/00* (2006.01)
*H04B 7/00* (2006.01)
*H04B 7/185* (2006.01)

(52) U.S. Cl. ....... 455/63.1; 455/67.13; 455/69; 370/318

(58) Field of Classification Search ................. 455/522, 455/63.1, 67.11, 67.13, 69; 370/318
See application file for complete search history.

(56) References Cited

U.S. PATENT DOCUMENTS

| | | | |
|---|---|---|---|
| 6,011,970 A * | 1/2000 | McCarthy | 455/436 |
| 6,539,235 B1 * | 3/2003 | Schwent et al. | 455/522 |
| 6,751,187 B2 * | 6/2004 | Walton et al. | 370/210 |
| 6,836,673 B1 * | 12/2004 | Trott | 455/562.1 |
| 7,424,268 B2 * | 9/2008 | Diener et al. | 455/62 |
| 7,433,296 B2 * | 10/2008 | Tsuie | 370/203 |
| 7,756,542 B1 * | 7/2010 | Kaiser et al. | 455/522 |
| 2002/0080887 A1 * | 6/2002 | Jeong et al. | 375/295 |
| 2002/0126777 A1 * | 9/2002 | Kasapi et al. | 375/346 |
| 2006/0160550 A1 * | 7/2006 | Edwards | 455/509 |
| 2008/0268892 A1 * | 10/2008 | Hamdi et al. | 455/522 |
| 2008/0311938 A1 * | 12/2008 | Song | 455/500 |
| 2010/0309317 A1 * | 12/2010 | Wu et al. | 348/180 |

OTHER PUBLICATIONS

"Comments of Intel Corporation", *Before the Federal Communications Commission*, In the Matter of: Additional Spectrum for Unlicensed Devices Below 900 MHz and in the 3 GHz Band, (Apr. 7, 2003), 1-44.

"Reply Comment of Intel Corporation", *Before the Federal Communications Commission*, in the Matter of: Additional Spectrum for Unlicensed Devices Below 900 MHz and in the 3 GHz Band, (May 16, 2003), 1-24.

* cited by examiner

*Primary Examiner* — Andrew Wendell
(74) *Attorney, Agent, or Firm* — Schwegman, Lundberg & Woessner, P.A.

(57) ABSTRACT

Controlling a signal transmitted from a device in a vacant channel in a spectrum.

19 Claims, 7 Drawing Sheets

METHOD AND APPARATUS FOR MANAGING COMMUNICATIONS

TECHNICAL FIELD

This application relates generally to communication systems and, more particularly, to managing communications.

BACKGROUND

Electromagnetic waves are used for wireless communications. Sections of the electromagnetic spectrum are divided into bands of frequency, also called channels, to be used for communications. In the United States, the Federal Communications Commission (FCC) regulates how the channels in the spectrum are allocated and used. Communications in the spectrum must be managed according to FCC regulations.

DETAILED DESCRIPTION

Figure 1:
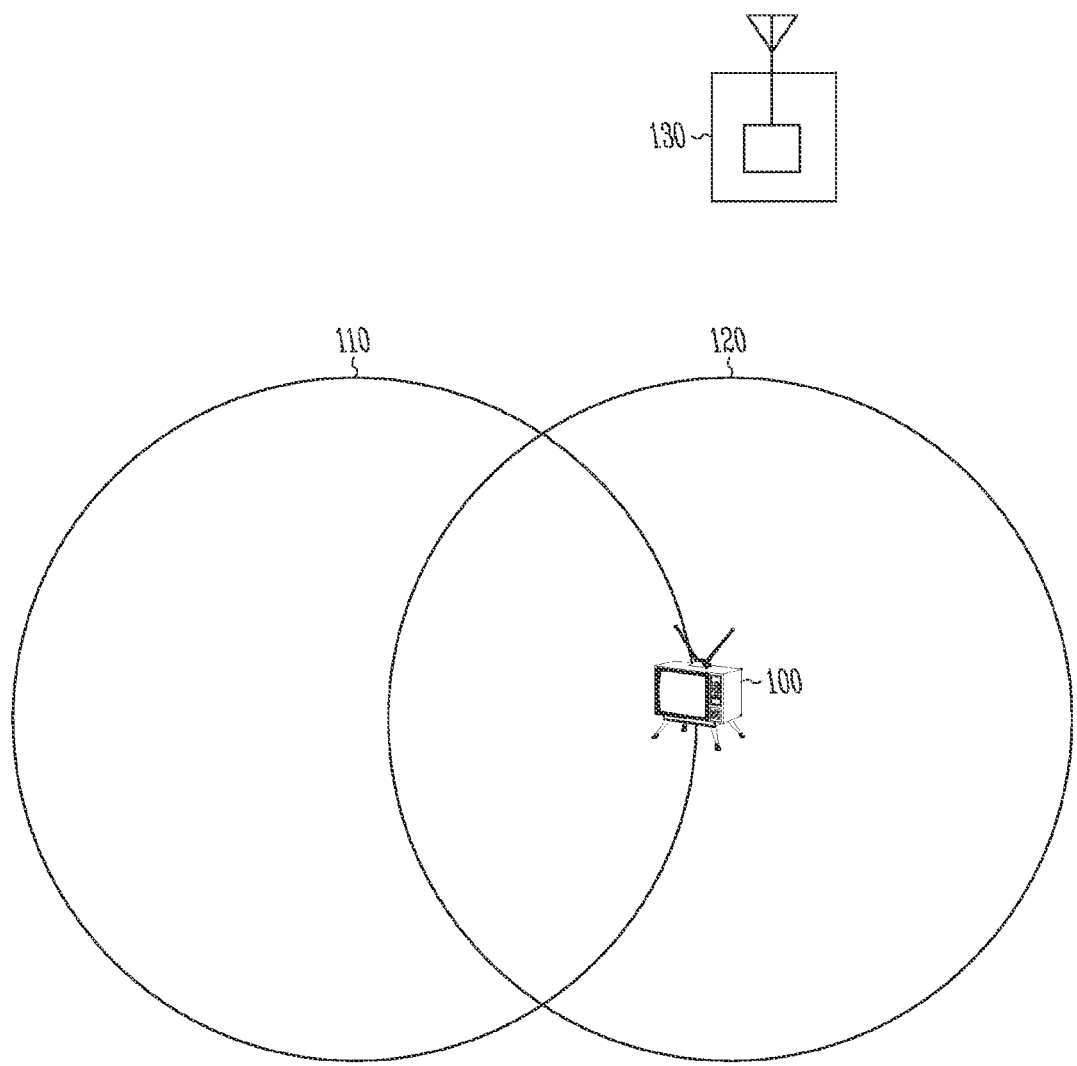
FIG. 1 illustrates coverage areas of TV stations according to various embodiments.

In the following detailed description of various embodiments, reference is made to the accompanying drawings that form a part hereof, and in which are shown by way of illustration, and not of limitation, specific embodiments in which the subject matter may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that compositional, structural, and logical substitutions and changes may be made without departing from the scope of this disclosure. The following detailed description, therefore, is not to be taken in a limiting sense.

Examples and embodiments merely typify possible variations. Individual components and functions are optional unless explicitly required, and the sequence of operations may vary. Portions and features of some embodiments may be included in or substituted for those of others. The following description is, therefore, not to be taken in a limiting sense.

Embodiments described herein take advantage of potential changes in the way the Federal Communications Commission (FCC) regulates channels in the radio frequency (RF) spectrum, and the embodiments described herein are applicable to any portion of the spectrum, regulated or unregulated. In future the FCC may permit unlicensed devices to transmit wireless signals in the VHF or UHF frequency range as long as such use does not interfere with licensed devices, such as television (TV) broadcast stations. The FCC may also add areas of the regulated spectrum in which unlicensed devices are permitted to transmit wireless signals.

The proposed changes in FCC regulations will allow communications apparatus to self manage their operation so as to avoid interference to other users of the frequency band. The intent of the proposed FCC rule change is to allow operation of unlicensed devices on the condition that they do not cause interference to co-channel TV receivers within a Grade B coverage contour. This is illustrated in FIG. 1 according to an embodiment in which a TV receiver 100 is located on a co-channel Grade B contour 110. Because of the principles used in the TV allotment plan (of the FCC), Grade B contours will, with the exception of collocated TV stations, cover very different areas and at the edge of the co-channel Grade B contour 110, the adjacent channel signal levels will in general be higher. This is illustrated in FIG. 1 in which the TV receiver 100 located on the co-channel Grade B contour 110 is well within an adjacent channel Grade B contour 120. Two types of interference are therefore to be avoided by an unlicensed device 130 when communicating in a regulated spectrum, co-channel interference and adjacent channel interference.

Co-channel interference refers to interference with licensed transmissions in the same channel. Co-channel interference avoidance is dependent on reliable determination of what channels are occupied by broadcasters within the interference range of the unlicensed device 130 and the inhibiting of transmissions on those frequencies.

Adjacent channel interference refers to interference with licensed transmissions on both channels adjacent to the channel on which the unlicensed device 130 is transmitting. It is necessary to protect an adjacent channel TV receiver (such as TV receiver 100) in close proximity to the unlicensed device 130. The unlicensed device 130 may be operating on a channel adjacent to an occupied TV broadcast channel and the emissions of the unlicensed device 130 must be controlled to reduce interference to the nearby TV receiver 100. Avoidance of adjacent channel interference requires transmitter power control combined with low out of channel emissions. The maximum transmitter power allowed to the unlicensed device 130 is dependant on the desired to undesired signal ratios for adjacent channel operation as prescribed in the TV allotment plan and the path loss over distances as low as a few meters.

Embodiments described herein show cognitive devices, such as an embodiment of the unlicensed device 130, that employ autonomous channel characterization techniques. Autonomous channel characterization refers to a class of techniques that sense the spectrum environment and from the environment detected autonomously determine the channels that are occupied and hence by inference determine the channels that may be used. Channels that are not occupied may be called vacant channels or white space. An autonomous channel characterization technique according to embodiments described herein characterizes each of the channels by a power level received at the unlicensed device 130.

White space is identified according to embodiments as a channel or set of channels in which there are no signals above a predefined level. The predefined level is set at some detection threshold (X dB) below the lowest usable signal level of the TV receiver 100 (with a high gain antenna) at the outer edge of a Grade B coverage contour. The value of X is developed from consideration of the desired to undesired signal ratio required at the TV receiver 100 and the differential obstruction and fade losses over the paths from the TV station to the TV receiver 100 and from the TV station to the channel characterization receiver in the unlicensed device 130. The detection threshold X dB below the Grade B signal level is established according to an embodiment based on consideration of the following:

- Height loss ($H_L$) of the unlicensed device 130 antenna with respect to the height of a protected service receiver.
- Gain ($G_A$) of a TV receiver antenna with respect to the gain of the unlicensed device 130 antenna.
- Differential shadow loss ($L_S$), between a TV station and the unlicensed device 130 and the TV station and the TV receiver 100.
- Multi path fading loss ($L_M$), or
- Relative power level ($P_F$) of the feature(s) to be detected with respect to the overall power of the TV signal.
- Processing gain ($P_G$) applicable to the method of mitigation of the specific unlicensed device 130 to correct for any of the above factors e.g application of fade mitigation techniques.

From consideration of the above the detection threshold is X dB below the Grade B signal level where:

$$X = H_L + G_A + L_S + L_M + P_F - P_G \quad (1)$$

As an example according to embodiments, detection of signals 41 dB below the signal at the grade B contour, equivalent to −83 dBm at the receiver, requires detection at −124 dBm. For detection of the pilot tone feature this can be accomplished by the use of narrow band filters having a bandwidth of 465 Hz or by the use of wider filters combined with averaging over time.

To facilitate detection and measurement of TV station signals at these low levels narrow band filters centered at the frequency of the TV channel pilot or sub carrier frequencies are described according to embodiments. Other signal feature detection techniques could also be used according to embodiments. The white space so identified may then be used for transmission by the unlicensed device 130 on a non-interfering basis with a co-channel TV receiver (such as the TV receiver 100) at the prescribed separation distance. If only co-channel protection is required then the maximum power of transmission is determined by the path loss applicable at the separation distance and the desired to undesired signal ratio required at the TV receiver 100. In the co-channel case, the desired signal is the minimum signal at the edge of the Grade B contour.

Figure 2:
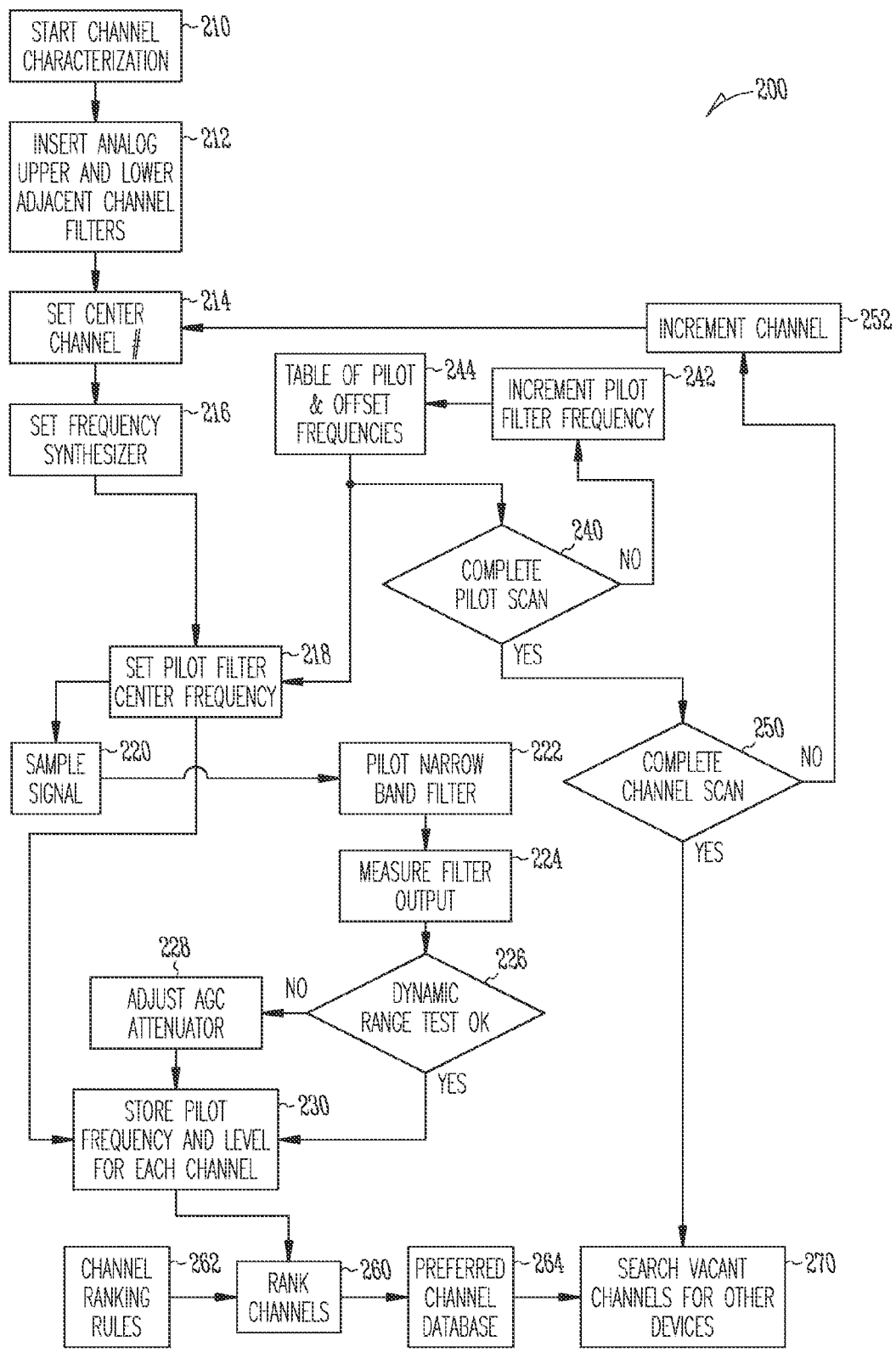
FIG. 2 illustrates a block diagram of a method according to various embodiments.

FIG. 2 depicts a block diagram of a method 200 according to an embodiment. The method 200 is to be implemented by the unlicensed device 130 to characterize channels, rank the characterized channels, and then search vacant channels for other devices. Control of channel characterization is started in block 210, and analog upper and lower adjacent channel filters are inserted in block 212 to filter received signals. A channel number is set in block 214, and a frequency synthesizer is set in block 216 to coincide with the channel set in block 214. The method 200 characterizes channels at pilot tones (pilot frequencies) of carriers for the channels, and a center frequency of a pilot filter is set in block 218 near a pilot frequency of the channel set in block 214. A signal received by the unlicensed device 130 is sampled in block 220, and is filtered in block 222 by the pilot filter which is a narrow band filter. The narrow band filter has a bandwidth of 465 Hz in an embodiment. A power of the filtered signal from the narrow band filter is measured in block 224. A dynamic range test of an output of the narrow band filter is performed in block 226, and if the dynamic range is not acceptable, an automatic gain control attenuator is adjusted in block 228. The power of the filtered signal from the narrow band filter and the center frequency of the pilot filter are stored as data in a memory in block 230.

The method 200 also characterizes channels at offset increments from each pilot tone. The first center frequency of the pilot filter set in block 218 for a channel is set near a nominal pilot frequency of the channel. The method 200 determines in block 240 whether a complete scan of the pilot frequency for the channel is finished, and if not, the pilot filter frequency is incremented in block 242. The method 200 then consults a table of pilot and offset frequencies in 244 before setting the pilot filter center frequency in block 218 and sampling a received signal in block 220. The method 200 increments the pilot filter frequency in block 242 several times until sufficient data is collected for the channel. In one embodiment, the pilot filter frequency is selected in block 242 to be an increment less than the nominal pilot frequency of the channel, and is then selected in block 242 to be an increment greater than the nominal pilot frequency of the channel. Therefore, three sets of data are stored for each channel in the memory in block 230. In one embodiment, the increment is 10 KHz.

The method 200 determines in block 250 whether a complete scan of the channels is finished. If all the channels have not been scanned, the channel is incremented in block 252, and the method 200 proceeds to block 214 to set the channel number.

Once all of the channels have been scanned and data for the spectrum of interest is stored in the memory, the channels are ranked in block 260 according to a set of channel ranking rules stored in memory and retrieved in block 262. The channel ranking rules rank channels that are vacant, and favor vacant channels with higher and near equal power signals in adjacent channels. More specifically, vacant channels are ranked according to the following preferences:

1. Center channel from a contiguous set of three or more adjacent channels;
2. Adjacent channel power levels both exceed 80 dBμV/m;
3. Adjacent channels are both Digital Television (DTV) and exceed 57 dBμV/m;
4. Power level in both channels is closest to being equal; and
5. Lower power adjacent channel is DTV and exceeds 41 dBμV/m.

The channel ranking is then loaded into a preferred channel database in 264 for the unlicensed device 130. Vacant channels occupy white space as defined above.

Figure 3:
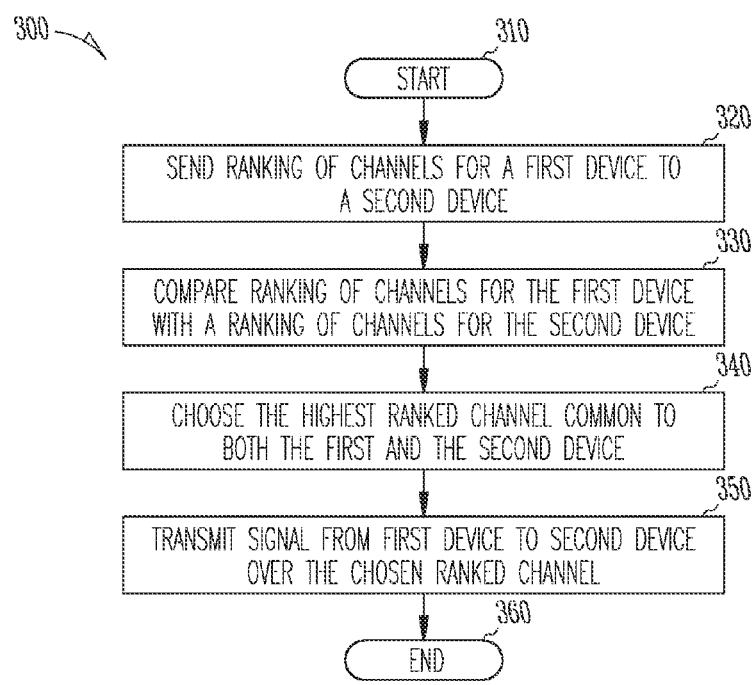
FIG. 3 illustrates a block diagram of a discovery protocol according to various embodiments.

Once the channels in the spectrum of interest have been characterized, the method 200 searches vacant channels for other devices in 270 according to a discovery protocol. FIG. 3 depicts a block diagram of a discovery protocol 300 according to an embodiment. The discovery protocol 300 starts in block 310, and in block 320 the ranking of channels for a first device (the unlicensed device 130) is sent to a second device. The ranking of channels for the first device is compared with a ranking of channels for the second device in block 330. The comparison may take place in the second device. Channels are ranked for the second device according to the same channel ranking rules described with reference to block 262 in method 200. The discovery protocol 300 then chooses a ranked channel in block 340 that is a highest ranked channel that is common to both the first device and the second device over which communication is to take place. Finally, a signal is transmitted from the first device to the second device over the chosen ranked channel in block 350, and the discovery protocol ends in block 360.

Few if any locations exist in metropolitan areas where more than one contiguous vacant channel exists. In most cases, therefore, the unlicensed device 130 shown in FIG. 1 will be operating on a channel adjacent to an occupied TV broadcast channel and the emissions of the unlicensed device 130 should be controlled to prevent interference to a nearby TV receiver such as the TV receiver 100. It is generally accepted that operation that would cause interference to one's own TV systems can be controlled by a user. The concern is therefore the interference to a neighbor.

If a transmit power of the unlicensed device 130 is set relative to the actual signal level in the adjacent channel then it should be possible to transmit at higher powers on a non-interfering basis. This is the reason vacant channels are ranked in block 260 of the method 200 to favor vacant channels with higher power signals in adjacent channels. The unlicensed device 130 therefore includes a radiated power control mechanism (not shown) that is slaved to a power detected in an adjacent channel. The transmitter power control is based on the signal power measured in the weaker of the two adjacent channels. The maximum power transmitted by the unlicensed device 130 is limited by co-channel interference considerations and is determined by adjacent channel protection requirements according to embodiments.

Adjacent channel interference can also be caused by out of band emissions from the unlicensed device 130 that fall into the adjacent channel. To prevent such emissions from causing interference they must effectively meet the co-channel interference requirements at the TV receiver 100.

In practice, the closer the unlicensed device 130 is to the adjacent channel TV receiver 100 the more closely will the paths from the TV station (not shown) be correlated and hence smaller protection margins will be necessary. As the physical separation between the unlicensed device 130 and the TV receiver 100 increases so does the path loss between them increase and this increase compensates for the lower correlation of the path losses to the TV station.

Also, unlike the detection of co-channel TV stations, the power control is self compensating in favor of the TV receiver 100 in the event that the unlicensed device 130 is located in a null or otherwise unfavorable receiving location. Therefore, to maximize the performance of the unlicensed device 130 in those locations for which the adjacent channel signal strength exceeds the minimum required by a TV receiver, transmitter power control should be enabled to control power levels from −8 dBm up to the maximum permitted by the FCC.

Figure 4:
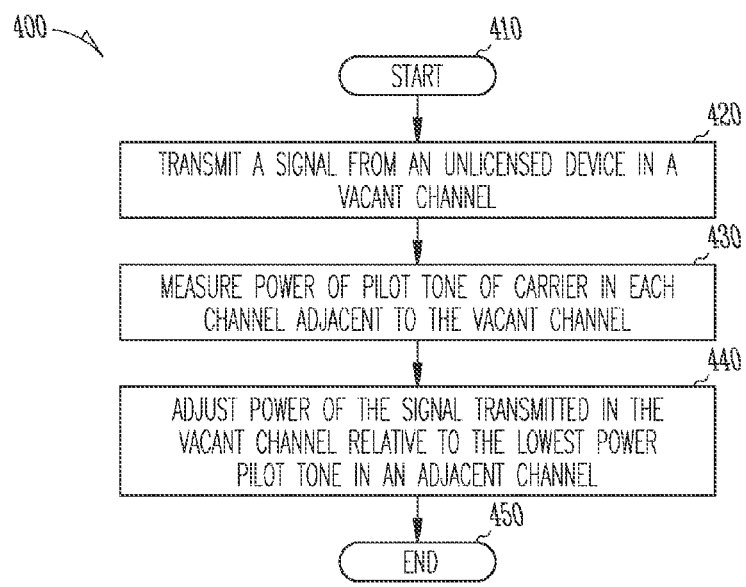
FIG. 4 illustrates a block diagram of a method for controlling a power of a signal transmitted from an unlicensed device according to various embodiments.

FIG. 4 depicts a block diagram of a method 400 for controlling the power of a signal transmitted from the unlicensed device 130 according to an embodiment. The method 400 starts in block 410, and in block 420 a signal is transmitted from the unlicensed device 130 in a vacant channel. The method 400 measures the power of a pilot tone of the carrier in each channel adjacent to the vacant channel in block 430. The power of the signal transmitted in the vacant channel is adjusted in block 440 relative to the power of the lowest power pilot tone in an adjacent channel. The method 400 ends in block 450. An advantage of the method 400 is that there is no need for the unlicensed device 130 to be calibrated according to absolute calibration values according to embodiments. There is no need for absolute power control to be calibrated into the unlicensed device 130 because the power of a transmission from the unlicensed device 130 is adjusted relative to the power of the lowest power pilot tone in an adjacent channel.

The pilot tone detection technique using a narrow band filter according to the method 200 described with reference to FIG. 2 is vulnerable to narrow band multipath fading in which the pilot tone signal as seen at the unlicensed device 130 is deeply faded (up to 30 dB) with respect to the signal at the nearby TV receiver 100. Such deep fading occurs when the signal at the antenna is the vector sum of two multipath signal components with the same amplitude but opposite in phase. Various models can be used to calculate the probability versus the fade depth. The sensitivity can be increased through the use of a reduced filter bandwidth, or other noise averaging techniques, to address the fade depth applicable to any desired probability of detection. The consequence of this increased sensitivity is that under more benign conditions detection of very distant TV stations will occur.

Figure 5:
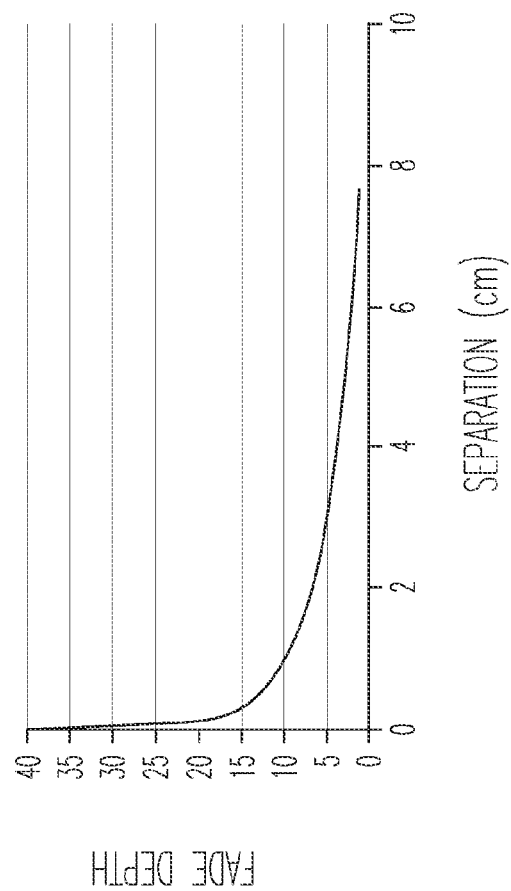
FIG. 5 illustrates a plot of a fade depth for a pilot tone according to various embodiments.

An alternative to increasing the detection sensitivity is to use a simple diversity antenna. As shown in FIG. 5, the fade depth for a narrow band pilot tone can be reduced to less than 6 dB for a separation of antenna phase centers of only 2 centimeters. There are many techniques by which the effective antenna phase centers can be separated by this small amount. Through the use of a switch that rapidly scans between the two antennas the problem of detection in the presence of deep narrow band fades can be mitigated.

Another method of channel characterization according to an embodiment is to use a digital signal processor (DSP) to do a fast Fourier transform (FFT) across the band of interest. The following equations (and results) apply for this method:

A. A sampling rate/FFT size=BIN width; (For example, 26.9 MHz/256=105.08 KHz width).

B. Using the equation derived for a narrow band approach results in a 17.5 dB processing gain (10*log 10[6 MHz/105.08 KHz]=17.5 dB).

C. By averaging over a number of segments, the method can also increase the processing gain (averaging the FFT over 1 millisecond, the result is 10 log 10[105]=20.2 dB).

D. The two processing gains are added to achieve the final result (17.5+20.2=37.7 dB total processing gain for the system).

The digital TV (DTV) signal to be used by broadcast stations in the future has a number of features that can be exploited for signal detection when using modern signal processing techniques. Some features, such as the frame sync, can be used to achieve a very high gain but may require processing times lasting many frames. A faster technique would be to use the limited symbol set of the 8-ary VSB signal to construct an eye diagram averaged over many symbols to effectively cancel the random noise. These cyclo-stationary based techniques may be used to achieve gains in excess of 30 dB which should be sufficient to permit reliable detection of the DTV signal if narrow band fading effects are avoided. Channels may be characterized with such methods according to embodiments.

Figure 6:
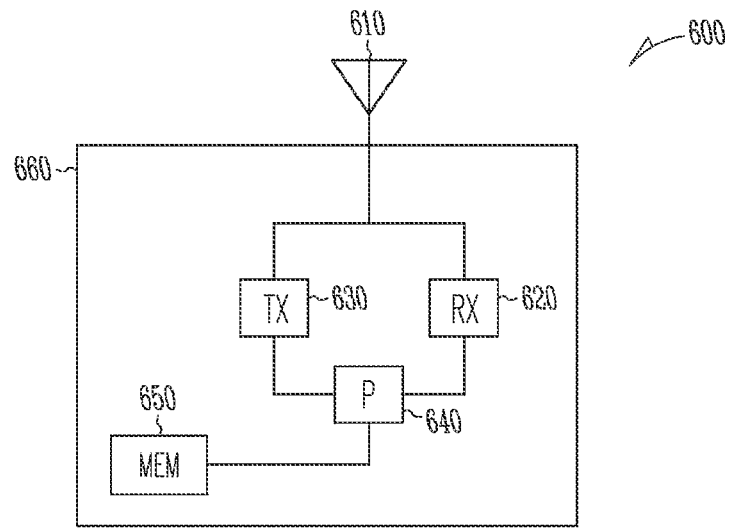
FIG. 6 illustrates a block diagram of a wireless computing platform according to various embodiments.

A block diagram of a wireless computing platform 600 is shown in FIG. 6 according to an embodiment. The wireless computing platform 600 may comprise the unlicensed device 130 shown in FIG. 1 according to an embodiment. The wireless computing platform 600 is a cognitive device according to an embodiment. The wireless computing platform 600 may be hand-held or larger. The wireless computing platform 600 may interact with one or more networks such as a WAN (Wireless Area Network), a WLAN (Wireless Local Area Network), and a WPAN (Wireless Personal Area Network) according to embodiments. The wireless computing platform 600 may be any device capable of conducting wireless communication (e.g., infra-red, radio frequency, etc.) and executing a series of programmed instructions (e.g., a personal digital assistant, a laptop, a cellular telephone, etc.).

The wireless computing platform 600 includes an antenna 610, a receiver circuit 620 coupled to the antenna 610, and a transmitter circuit 630 coupled to the antenna 610. A processor 640 is coupled between the receiver circuit 620, the transmitter circuit 630, and a memory 650. The processor 640, the receiver circuit 620, the transmitter circuit 630, and the memory 650 are located in a housing 660. The antenna 610 may comprise an isotropic antenna, a monopole, a dipole, an omnidirectional antenna, or a patch antenna, among others, according to embodiments. The transmitter circuit 630 includes a radiated power control mechanism such as the mechanism described above to control the power of signals transmitted from the wireless computing platform 600.

The processor 640 is coupled to exchange information with the memory 650. The memory 650 includes a non-volatile memory such as an electrically erasable and programmable read only memory (EEPROM), or a flash memory device according to an embodiment. The memory 650 also includes a volatile memory device such as a random access memory device or a dynamic random access memory device (DRAM) according to another embodiment. The wireless computing platform 600 is a machine and the memory 650 is a machine-accessible medium having associated information, where the information, when accessed by the processor 640, the receiver circuit 620, and the transmitter circuit 630, results in the machine performing the methods and protocols described above with respect to FIGS. 1-5 according to an embodiment. The memory 650 is also capable of storing data generated by operation of the methods and protocols described above with respect to FIGS. 1-5. The memory 650 may also include a magnetic or optical disk according to other embodiments.

The antenna 610 is a near isotropic pattern antenna of zero gain according to an embodiment that can be easily accommodated on small platforms. Through the use of the isotropic antenna the desired to undesired signal ratio due to the power radiated in the direction of the TV receiver 100 is self compensating and independent of the relative direction of the TV station, the TV receiver 100 and its antenna, and the location and attitude of the unlicensed device antenna 610 according to an embodiment.

Figure 7:
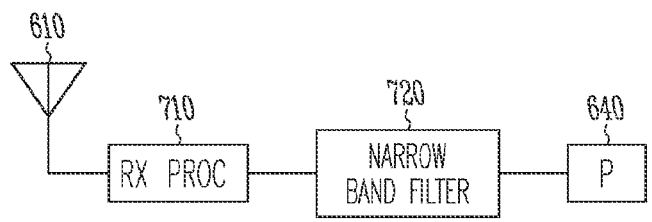
FIG. 7 illustrates a block diagram of a receiver circuit according to various embodiments.

In one embodiment, the receiver circuit 620 includes a receiver processing circuit 710 coupled to the antenna 610, and a narrow band filter 720 coupled between the receiver processing circuit 710 and the processor 640 as is shown in FIG. 7.

Figure 8:
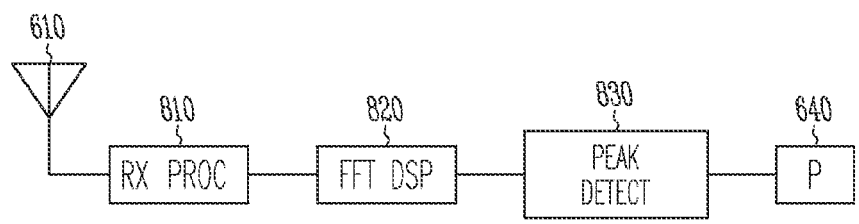
FIG. 8 illustrates a block diagram of a receiver circuit according to various embodiments.

In another embodiment, the receiver circuit 620 includes a receiver processing circuit 810 coupled to the antenna 610, a digital signal processor (DSP) 820 coupled to the receiver processing circuit 810, and a peak detect circuit 830 coupled between the DSP 820 and the processor 640 as is shown in FIG. 8. The DSP 820 includes a fast Fourier transform (FFT) algorithm to analyze signals received by the antenna 610. The peak detect circuit 830 is coupled to the DSP 820 to detect peaks in the analyzed signals, and the processor 640 is coupled to the peak detect circuit 830 to receive an output from the peak detect circuit 830.

Figure 9:
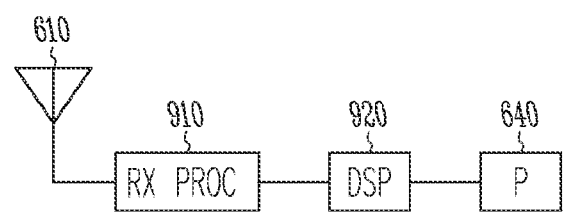
FIG. 9 illustrates a block diagram of a receiver circuit according to various embodiments.

In another embodiment, the receiver circuit 620 includes a receiver processing circuit 910 coupled to the antenna 610, and a digital signal processor (DSP) 920 coupled between the receiver processing circuit 910 and the processor 640 as is shown in FIG. 9. The DSP 920 includes an embedded memory circuit (not shown) and circuits to analyze signals received by the antenna 610. The processor 640 is coupled to the DSP 920 to receive an output from the DSP 920.

Figure 10:
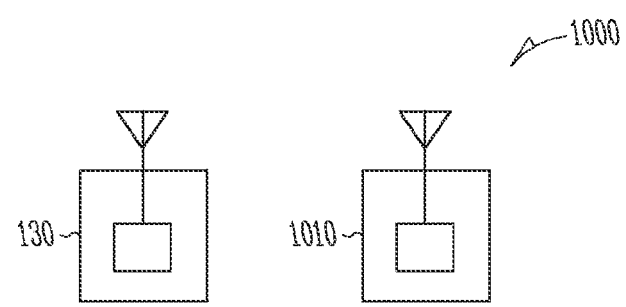
FIG. 10 illustrates a block diagram of a system according to various embodiments.

A block diagram of a system 1000 is shown in FIG. 10 according to an embodiment for carrying out the methods and protocols described above with reference to FIGS. 1-5. The system includes a first device such as the unlicensed device 130 described above with respect to FIG. 1, and a second device 1010. The second device 1010 is also an unlicensed device according to an embodiment. The unlicensed device 130 and the second device 1010 communicate and send data over a vacant channel according to the methods and protocols described above with reference to FIGS. 1-5.

Some embodiments of the invention described above with respect to FIGS. 1-10 can unambiguously identify white space with a prescribed level of reliability. Some embodiments do not require a priori knowledge of their location with respect to TV stations and TV receivers. Some embodiments do not require the maintenance of a data base of TV stations, signal strengths and/or terrain. Some embodiments automatically adjust their power to provide a maximum range for unlicensed service consistent with protecting TV receivers. Some embodiments automatically adjust to variations in the transmit power of a TV station. Some embodiments automatically adjust to the actual grade B contour taking into account the directivity of a TV station transmitter and terrain. Some embodiments do not require a large platform to mount directional antennas. Some embodiments can be used with any desired signal format although there may be usage models where compatibility with a local TV format is advantageous. Some embodiments allow Ad hoc operation, or communication between devices without an access point. Some embodiments can be designed with a prescribed level of sensitivity to overcome a hidden transmitter, such as a Broadcast station, or hidden TV receiver problems. The discovery mode protocol described above with respect to FIG. 3 finds mutually shared white space while reducing the risk of operation in incorrectly identified white space.

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a non-transitory computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or inter-process communication techniques, including remote procedure calls. The teachings of various embodiments are not limited to any particular programming language or environment. Thus, other embodiments may be realized.

One of ordinary skill in the art will understand that the methods, protocols, and circuitry shown and described herein can be implemented using software, hardware, and combinations of software and hardware.

In an embodiment, the methods provided above are implemented as a computer data signal embodied in a carrier wave or propagated signal, that represents a sequence of instructions which, when executed by a processor cause the processor to perform the respective method. In an embodiment, methods provided above are implemented as a set of instructions contained on a computer-accessible medium capable of directing a processor to perform the respective method. In an embodiment, the medium is a magnetic medium, an electronic medium, or an optical medium.

The illustrations shown in FIGS. 1-10 are intended to provide a general understanding of the elements and structure of various embodiments, and are not intended to serve as a complete description of all the features of compositions, apparatus, and systems that might make use of the methods, protocols, elements, and structures described herein.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   sampling signals with a first device, the signals being from channels in a spectrum including a vacant channel;
   identifying channels in the spectrum for which the sampled signal is below a minimum power level of a usable transmitted signal in the spectrum, the identified channels being vacant channels;
   ranking the identified channels according to channel ranking rules favoring channels with higher and near equal power signals in adjacent channels;
   receiving a ranking of channels for a second device;
   choosing a channel over which the first device and the second device are to communicate, wherein choosing comprises:
      comparing the ranking of identified channels for the first device with the ranking of channels for the second device; and
      choosing a channel that is a highest ranked channel common to both the first device and the second device; and
   controlling a signal transmitted from the first device on the chosen channel.

2. The method of claim 1 wherein:
   controlling a signal transmitted from the first device further comprises transmitting a signal from an unlicensed device in a channel in a licensed spectrum; and
   further comprising receiving a usable transmitted signal from a licensed device in the licensed spectrum.

3. The method of claim 1, further comprising scanning a VHF or UHF frequency range with the first device for usable signals having a power above a minimum power level in a spectrum including the chosen channel.

4. The method of claim 1, further comprising selecting channels in a spectrum including the chosen channel that are vacant having signals below a minimum power level of a usable transmitted signal in the spectrum.

5. The method of claim 1, further comprising determining the vacant channel by analysis at the first device of a pilot tone in the vacant channel to determine that the pilot tone is below a minimum power level of a usable transmitted signal in a spectrum including the vacant channel.

6. The method of claim 1 wherein controlling a signal transmitted from the first device further comprises controlling a power of the signal transmitted from the first device relative to a power of a signal in an adjacent channel.

7. The method of claim 6, further comprising:
   measuring a power of a pilot tone of a carrier in each channel adjacent to the vacant channel; and
   wherein controlling a signal transmitted from the first device further comprises controlling a power of the signal transmitted from the first device relative to a power of a lowest power pilot tone in a channel adjacent to the vacant channel.

8. The method of claim 1, further comprising, for each sampled signal:
   setting a center frequency of a narrow band filter;
   filtering the sampled signal with the narrow band filter;
   measuring a power of the filtered signal from the narrow band filter; and
   determining if the power of the filtered signal is below a minimum power level of a usable transmitted signal in the spectrum.

9. The method of claim 1, further comprising:
   analyzing the sampled signals with a fast Fourier transform algorithm; and
   identifying channels in the spectrum for which a power of a received signal in the channel is below a minimum power level of a usable transmitted signal in the spectrum.

10. A method comprising:
    receiving signals in a first device, the signals being received from channels in a spectrum;
    analyzing a received signal at a pilot frequency in each channel in the first device;
    identifying vacant channels for which the received signal at the pilot frequency has a power that is below a minimum power level of a usable transmitted signal in the spectrum;
    ranking vacant channels, the channel ranking rules favoring channels with higher and near equal power signals in adjacent channels;
    receiving a ranking of vacant channels for a second device ranked according to the channel ranking rules;
    comparing the ranking of vacant channels for the first device with the ranking of channels for the second device;
    choosing a ranked channel that is a highest ranked channel that is common to both the first device and the second device;
    transmitting a signal from the first device to the second device over the chosen ranked channel; and
    adjusting a power of the signal transmitted from the first device relative to a power of a signal in a channel adjacent to the selected vacant channel.

11. The method of claim 10, further comprising:
    measuring a power of a pilot tone of a carrier in each channel adjacent to the selected vacant channel; and
    wherein adjusting a power of the signal further comprises adjusting the power of the signal transmitted from the first device relative to a power of a lowest power pilot tone in a channel adjacent to the selected vacant channel.

12. The method of claim 10 wherein analyzing further comprises:

sampling the received signals; and
for each sampled signal:
setting a center frequency of a narrow band filter;
filtering the sampled signal with the narrow band filter;
measuring a power of the filtered signal from the narrow band filter; and
storing the power of the filtered signal and the center frequency as data in a memory.

13. The method of claim 12, further comprising:
filtering the received signals with analog upper and lower adjacent channel filters;
for each channel in the spectrum:
setting a frequency synthesizer to coincide with the channel;
selecting one or more pilot frequencies in the channel; and
for each pilot frequency selected:
setting the center frequency of the narrow band filter near the pilot frequency;
filtering the sampled signal with the narrow band filter;
measuring a power of the filtered signal from the narrow band filter;
performing a dynamic range test of an output of the narrow band filter;
adjusting an automatic gain control attenuator in response to the dynamic range test; and
storing the power of the filtered signal and the center frequency as data in a memory.

14. The method of claim 13 wherein selecting one or more pilot frequencies in the channel further comprises:
selecting a first pilot frequency coincident with a nominal frequency of the channel;
selecting a second pilot frequency that is a selected increment less than the nominal frequency; and
selecting a third pilot frequency that is the selected increment greater than the nominal frequency.

15. The method of claim 10 wherein analyzing a received signal further comprises analyzing the received signal at the pilot frequency in each channel with a fast Fourier transform algorithm in the first device.

16. A system comprising:
a transmitter to transmit a signal in a vacant channel in a spectrum with a power adjusted relative to a power of a signal in a channel adjacent to the vacant channel; and
a receiver to identify vacant channels in the spectrum and to rank vacant channels in the spectrum according to channel ranking rules, the channel ranking rules favoring channels with higher and near equal power signals in adjacent channels;
a device to communicate with the transmitter and the receiver over the vacant channel wherein:
the receiver comprises a circuit to measure a power of a pilot tone of a carrier in each channel adjacent to the vacant channel; and
the transmitter comprises a circuit to adjust the power of the transmitted signal relative to a power of a lowest power pilot tone in a channel adjacent to the vacant channel; and
the vacant channel is a highest ranked channel that is common to the receiver and the device, the device including a ranking of channels.

17. The system of claim 16 wherein the receiver comprises a circuit to:
analyze received signals at pilot tones of carriers of channels in the spectrum, the spectrum comprising a licensed spectrum; and
identify vacant channels for which the received signals at the pilot tones of the carriers each have a power below a minimum power level of a usable transmitted signal in the spectrum.

18. The system of claim 16, further comprising:
a processor coupled to the receiver and the transmitter;
a volatile memory coupled to the processor to receive, store, and present data used by the processor; and
a non-volatile memory coupled to the processor, the non-volatile memory comprising instructions to be executed by the processor.

19. The system of claim 16 wherein the receiver comprises:
analog upper and lower adjacent channel filters;
a frequency synthesizer;
a narrow band filter; and
an automatic gain control attenuator.

\* \* \* \* \*